United States Patent [19]
Arnstein et al.

[11] Patent Number: 5,742,900
[45] Date of Patent: Apr. 21, 1998

[54] VOLTAGE-VARIABLE BIASED INVERTING LIMITER FOR RFI SUPPRESSION OVERVIEW

[75] Inventors: Donald S. Arnstein, Fairfax, Va.; Todd R. Czerner, Frederick, Md.

[73] Assignee: Comsat Corporation, Bethesda, Md.

[21] Appl. No.: 536,199

[22] Filed: Sep. 29, 1995

Related U.S. Application Data

[63] Continuation-in-part of Ser. No. 316,298, Sep. 30, 1994, abandoned.

[51] Int. Cl.$^6$ ............................................. H04B 1/16
[52] U.S. Cl. .................... 455/296; 455/235.1; 455/308; 455/311; 455/303; 327/551
[58] Field of Search ........................ 455/13.4, 23.1, 455/235.1, 296, 303, 311, 341, 308; 327/324, 331, 551; 375/346

[56] References Cited

U.S. PATENT DOCUMENTS 4,696,044  9/1987  Waller, Jr. ............................. 381/106
4,710,723  12/1987  Pelchat et al. ....................... 455/296 X
5,379,445  1/1995  Arnstein et al. ...................... 455/13.4

*Primary Examiner*—Chi H. Pham
*Attorney, Agent, or Firm*—Sughrue, Mion, Zinn, Macpeak & Seas, PLLC

[57] ABSTRACT

An enhanced nonlinear processor for RFI suppression uses a biased inverting limiter circuit. There are two parallel paths in the device; the first one is used to estimate the intensity of the RFI signal, the second one is used to process the signal. The first signal path employs an envelope detector and filter (to estimate RFI intensity) followed by a comparator circuit to avoid use of the processing if the RFI is too small; the second path has a biased inverting limiter whose characteristic is controlled by the output of the first path. When the estimate of the RFI intensity is close to being correct, the biased inverting limiter traps the large RFI signal, converting it into a higher order harmonic which is filtered out. The wanted signal is not trapped, but instead sees an "effective" positive gain which allows it to pass through unaffected except for a gain factor. The net result is a reduction in the ratio of unwanted signal to wanted signal.

20 Claims, 13 Drawing Sheets amplitudes near threshold

Note: $V_t = (2/\sqrt{3}) V_{t,RF}$

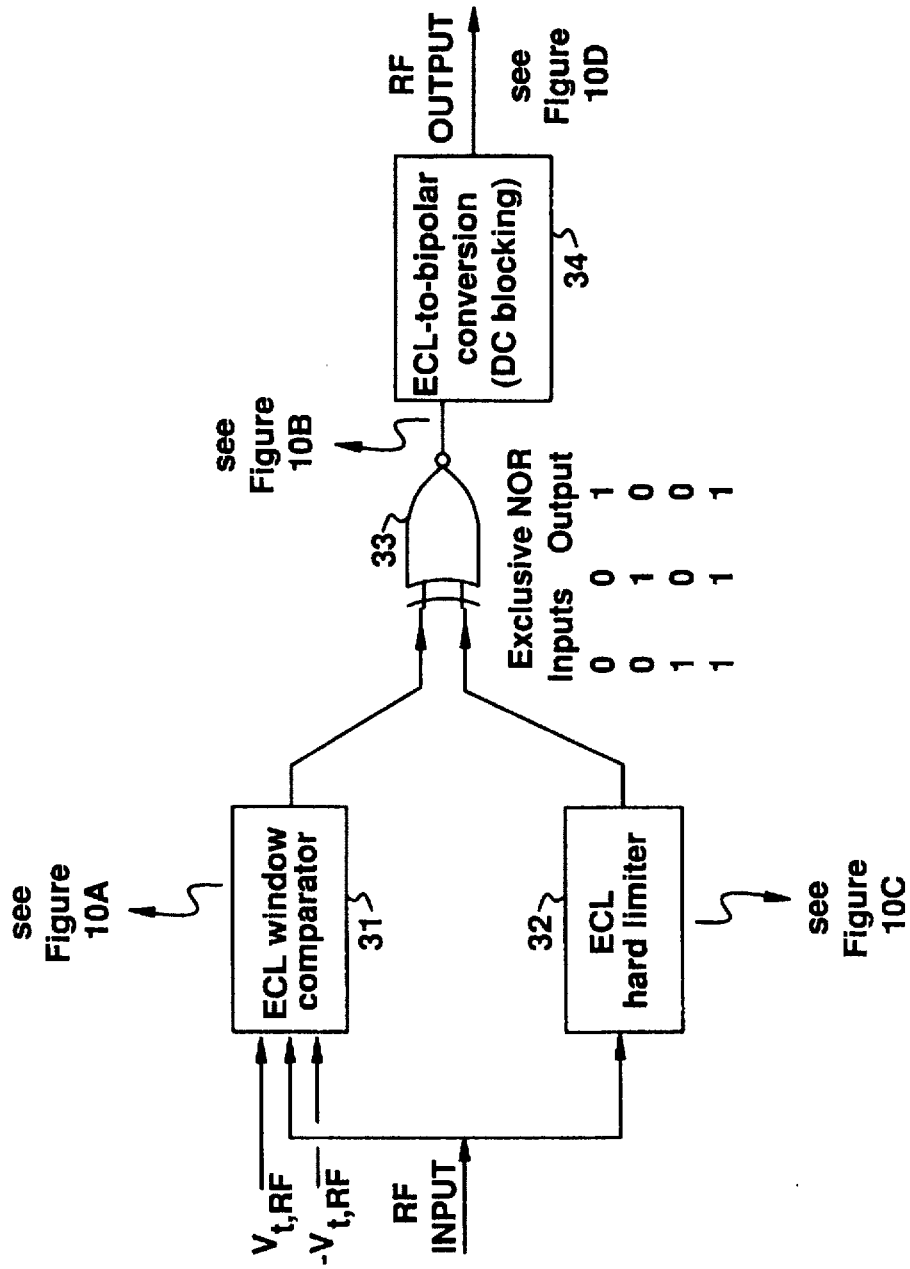

5,742,900

VOLTAGE-VARIABLE BIASED INVERTING LIMITER FOR RFI SUPPRESSION

OVERVIEW

This is a Continuation-in-Part of application Ser. No. 08/316,298 filed Sep. 30, 1994, now abandoned.

FIELD OF THE INVENTION

The present invention generally concerns radio-frequency interference (RFI) suppression techniques for application to communication systems, such as satellite systems. In particular, the invention concerns the protection of satellite transponders subject to jamming, to earth terminals subject to RFI, or in any other communication environment where RFI presents a problem.

BACKGROUND OF THE INVENTION

RFI reduction techniques fall into many different categories. The one for which this invention was intended to provide an improvement is a nonlinear automatic gain control (AGC) device referenced under the general heading of Smart AGC™. The Smart AGC™ concept is shown in a device 10 which is illustrated in simplified form in FIG. 1A and has been the subject of U.S. Pat. No. 5,379,445, issued on Jan. 3, 1995. The disclosure of that U.S. Patent is incorporated herein by reference. In the Figure, a wanted signal with interference is input to an adjustable time delay 11. The delayed signal is provided to a null zone envelope I/O unit 12, which has a characteristic response curve as illustrated in FIG. 1B. The input signal also is provided to an envelope detector 13 which could be realized by using a broad band radiometer power meter. The output serves as an input to a filter 14 having adjustable time constants. The output of filter 14 is input to the null zone envelope I/O 12 and acts to control its processing in the manner subsequently described. In brief, the RFI suppression characteristics of Smart AGC™ are provided by an active nonlinear device which is controlled by observation and processing of the input envelope.

The device 10 disclosed in the above referenced U.S. Patent Application utilized a biased "hard limiter" as shown in FIG. 1C. The hard limiter employed a "null zone," i.e., a range of input voltages for which the output voltage is zero. There are many different realizations of null zone nonlinearities, but the biased hard limiter is easy to implement since it has only 3 levels and has been analyzed extensively.

The hard limiter device used for active RFI suppression has a sensitivity to threshold error as shown in FIG. 1D for the special case where the input ratio of RFI to wanted signal was 30 dB (a factor of 1000 in signal power). In practice, one wants to operate the device at the point where the curve labeled (I+IM)/C is at a minimum. Any other point would be considered to have "tracking error." Tracking error will sometimes cause placement of the envelope threshold at a higher value than the peak of the composite input envelope and will destroy both the interfering and the wanted signals. FIG. 1D shows the (I+IM)/C curve approaching infinity when the threshold-to-interference ratio reaches about 0.275 dB. Another characteristic feature of the null zone device which is evident in FIG. 1D is that the minimum of the curve (I+IM)/C occurs at about 4.77 dB. This means that the best one can do, even adjusting the null zone for its best level, is to reduce an input I/C to an output level of about 4.77 dB. While this may be very good for some applications, it does not satisfy the need for a nonlinear device where the minimum level of (I+IM)/C is lower than 4.77 dB and which is less sensitive to tracking errors.

SUMMARY OF THE INVENTION

It is an object of the present invention to provide a nonlinear device which is less sensitive to threshold errors than the biased hard limiter.

It is a further object of the present invention to provide a nonlinear device that results in a better optimum output (I+IM)/C ratio.

It is yet another object of the present invention to provide a nonlinear device that uses signal inversion rather than a null zone in order to provide a nonlinear response characteristic.

These and other objects are achieved by providing a processor for RFI suppression that uses a biased inverting limiter.

BRIEF DESCRIPTION OF THE DRAWINGS

Specifically, FIGS. 5A and 5B show a phenomenon called an "amplitude trap", which occurs when the input signal amplitude is slightly larger by a factor $2/\sqrt{3}$ than the inversion point in the biased inverting limiter ($V_{t,RF}$ in FIG. 3C), the output envelope goes to zero (G(A)=0).

FIG. 9 is a block diagram of the biased inverting limiter circuit.

DESCRIPTION OF THE PREFERRED EMBODIMENT

To be of practical use, any signal processing scheme that exploits dynamic (time-varying) properties of signals must adapt to those properties. Such a scheme is termed adaptive.

Using x(t) to represent the input signal as a function of time and y(t) to represent the output signal, a nonlinearity obeys the following relationship for some time period:

$$y(bx_1(t)+cx_2(t)) \neq by(x_1(t))+cy(x_2(t)) \quad (1)$$

for arbitrary constants b and c and distinct input signals $x_1(t)$ and $x_2(t)$. A nonlinear signal transformation is referred to as being "memoryless" (or as having zero memory) when the output at an arbitrary instant in time depends on the input at the same instant and not on previous values of the input.

The band-limited input to a voltage nonlinearity, x(t), is modeled in complex envelope notation as having a center frequency $f_o$, a time-varying amplitude A(t), and a time-varying phase shift $\phi(t)$. To make notation simpler, the time variable may be suppressed.

A general voltage nonlinearity results in harmonic components at DC and an integer multiples of $f_o$. There are amplitude and phase transfer functions associated with each harmonic component. These transfer functions may be denoted by $G_m(A)$ and $F_m(A)$, respectively, and each set is referred to as the "mth-harmonic envelope nonlinearity". The subscript "1" is suppressed in references to the first harmonic; if a harmonic is not specified, the first harmonic is assumed.

The unfiltered output of a voltage nonlinearity is called v(x), which is v(x(t)) or v(t) for short. Using "RE{ }" to denote the real portion of a number, the signals associated with a voltage nonlinearity are expressed in terms of their complex envelope representations as:

INPUT (first harmonic only):

$$x(t) = Re\{A(t) e^{j(2\pi f_o t + \phi(t))}\} \quad (2a)$$

OUTPUT:

$$v(x(t)) = G_0(A) +$$

$$Re\left\{ G(A)e^{j(2\pi f_o t+\phi+F(A))} + \sum_{m=2}^{\infty} G_m(A) e^{j(2\pi m f_o t+m\phi+F_m(A))} \right\} \quad (2b)$$

This representation is based on well known theory of random signals and noise, or as otherwise explained herein.

The DC component and the mth harmonic components of v(t) for $2 \leq m \leq \infty$ (the mth zones) are normally not desired; they are removed by a first zone bandpass filter (BPF). The output of this BPF is expressed as:

$$y(t)=Re\{G(A)e^{j(2\pi f_o t+\phi+F(A))}\} \quad (3)$$

When the output amplitude is a negative number, this disclosure uses the convention of inverting its polarity and setting F(A) to 180° otherwise. G(A) is left alone and F(A) is zero. Any physical device may have additional phase shift characteristic contained in the F(A) function, e.g. "AM/PM conversion" of a traveling wave tube amplifier.

Figure 1A:
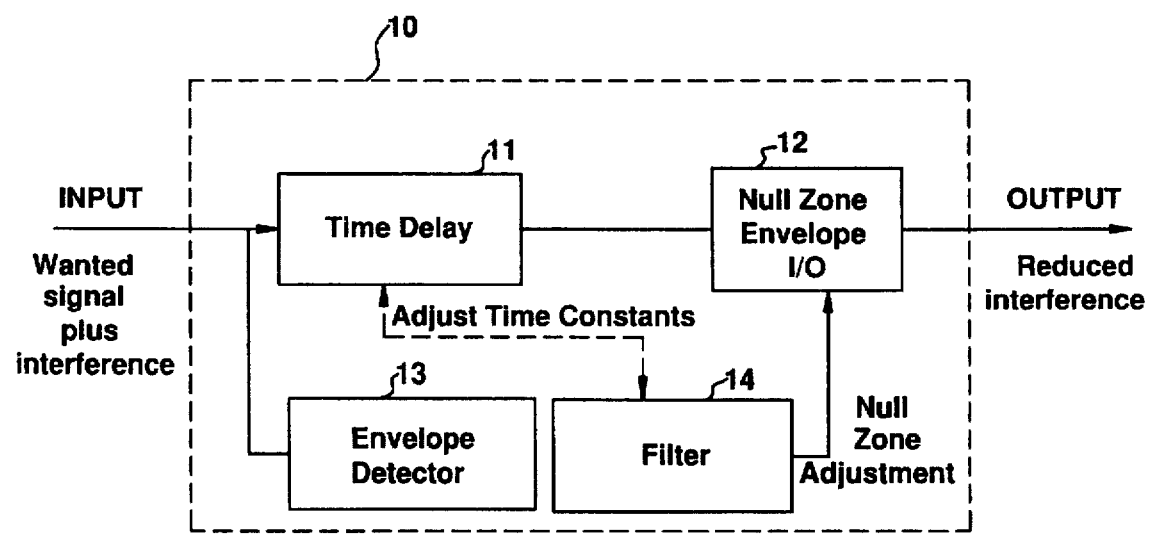
FIG. 1A is an illustration of a voltage-variable null zone device used in a signal processor for RFI suppression.
Figure 1B:
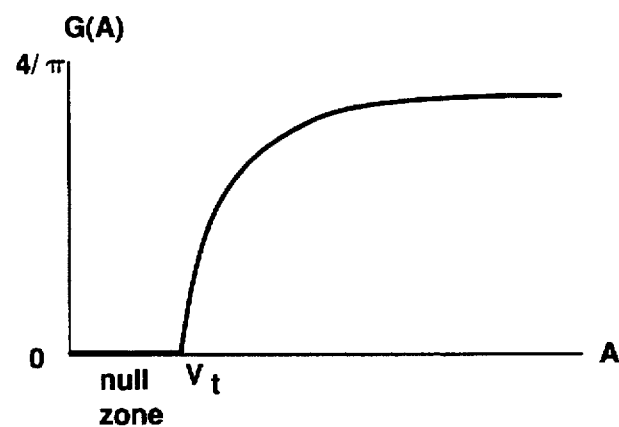
FIG. 1B is an illustration of the null zone envelope input-output curve which results using a conventional biased hard limiter design shown in FIG. 1A.
Figure 1C:
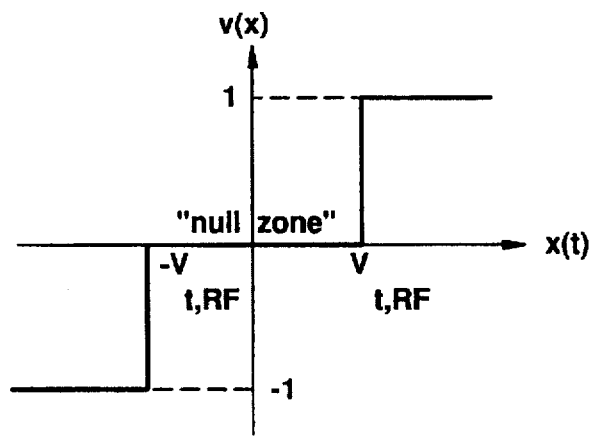
FIG. 1C is an illustration of a voltage variable null zone for FIG. 1A.
Figure 1E:
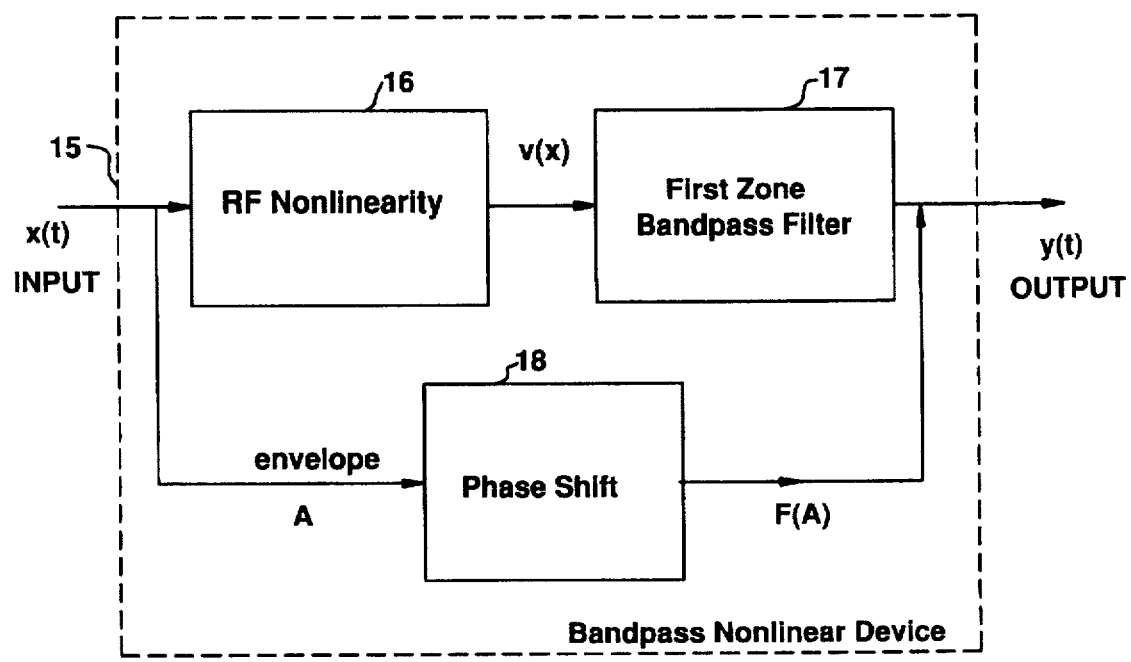
FIG. 1E is an illustration of a functional block diagram of a conventional bandpass nonlinear device.
Figure 1D:
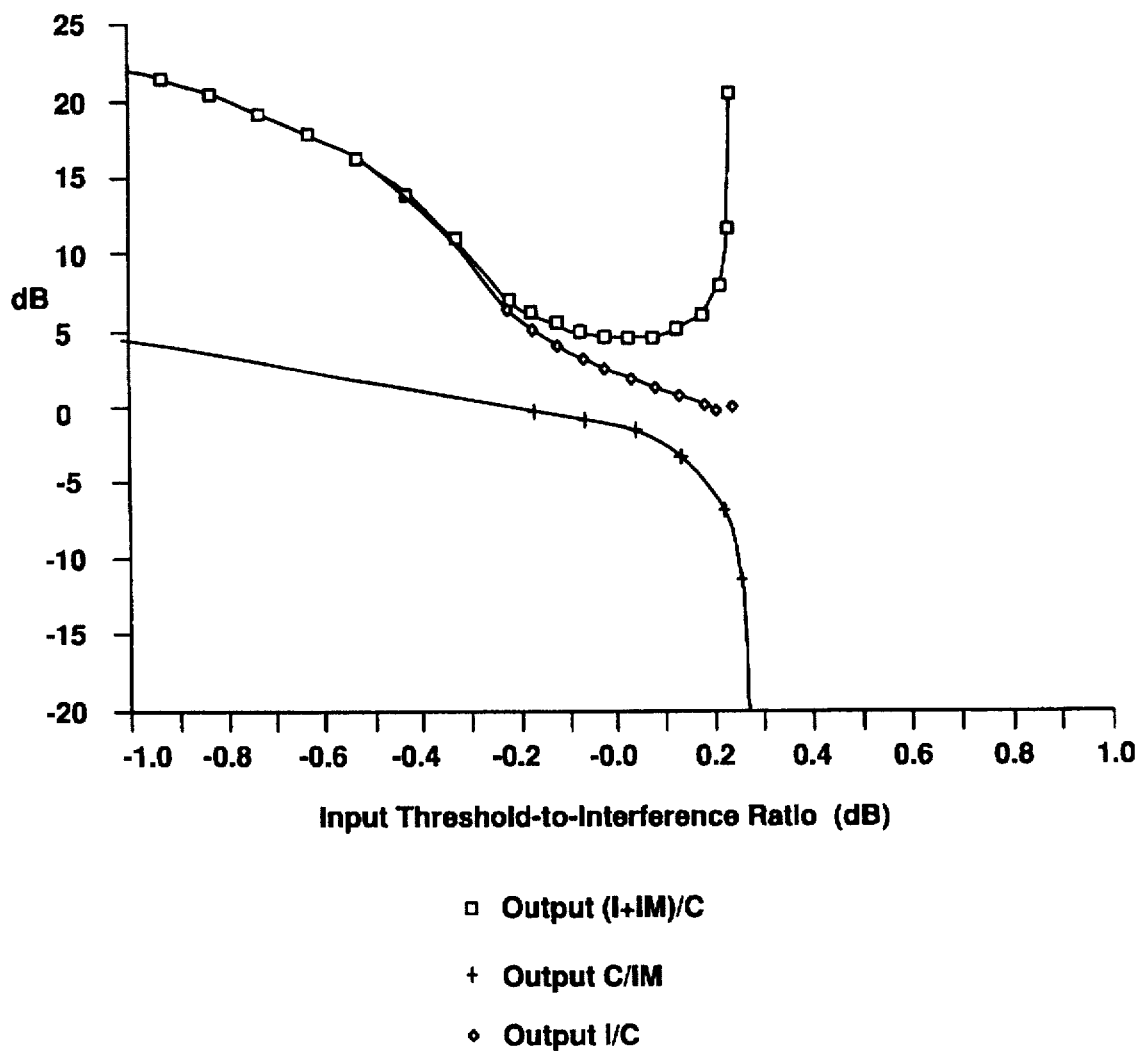
FIG. 1D is an illustration of the theoretical biased hard limiter sensitivity to threshold error for the case where the input I/C ratio was 30 dB (i.e., a factor of 1000).

The combination of the phase shift F(A) with the cascade of a voltage nonlinearity and a first zone BPF is called a "bandpass nonlinear device". FIG. 1E shows an equivalent bandpass nonlinear device model. In the figure, the bandpass nonlinear device 15 receives an input signal x(t), which is passed to an RF nonlinearity 16. The nonlinearity output v(x) is applied to a bandpass filter 17 (first zone) and is output from the bandpass nonlinear device 15. The input signal x(t) also is sent to a phase shifter 18 which converts the envelope A into a phase variable function F(A). At the output of device 15, the signal comprises the bandpass filtered first harmonic output phase shifted by F(A).

Figure 2:
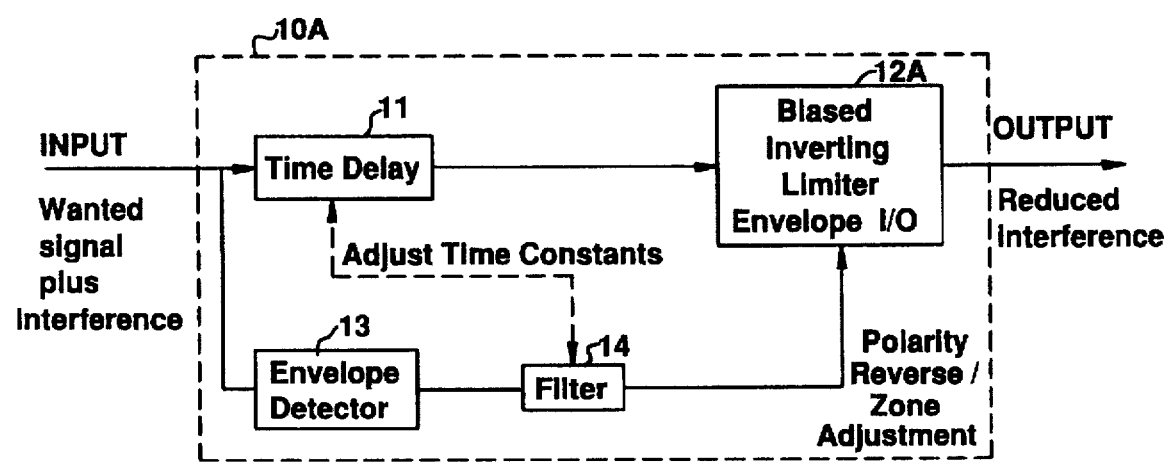
FIG. 2 is a biased inverting limiter used instead of a biased null zone limiter.

A block diagram of the Smart AGC™ which embodies a "biased inverting limiter" is illustrated in FIG. 2. As seen from a comparison with FIG. 1A, the arrangement and composition of system elements are basically the same, but for a substitution of one component. Specifically, the new nonlinear signal processor 10A contains an adaptive nonlinear amplifier 12A that has a biased inverting limiter and has an operational characteristic that does not contain a null zone.

Figure 3A:
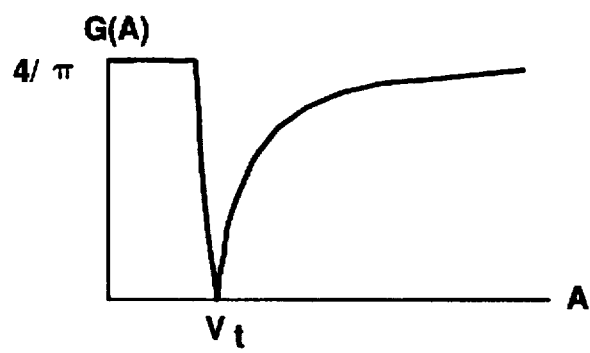
FIGS. 3A and 3B are illustrations of the envelope nonlinearity of a biased inverting limiter which can be contrasted to the characteristic shown in FIG. 1B.
Figure 3B:
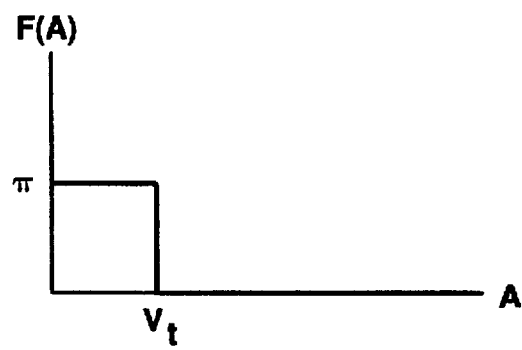

The envelope nonlinearity of the biased inverting limiter is pictured in FIGS. 3A and 3B. The AM/AM transfer function, G(A), of the biased inverting limiter is illustrated in FIG. 3A and has a zero at $A=V_r$. The nonlinearity effectively traps and eliminates the interference from the first zone while preserving the wanted signal. The AM/PM transfer function, F(A), is illustrated in FIG. 3B and causes the RF phase to reverse by 180° when the input envelope crosses the threshold value of $2/\sqrt{3} \; V_{t,RF}$.

Figure 3C:
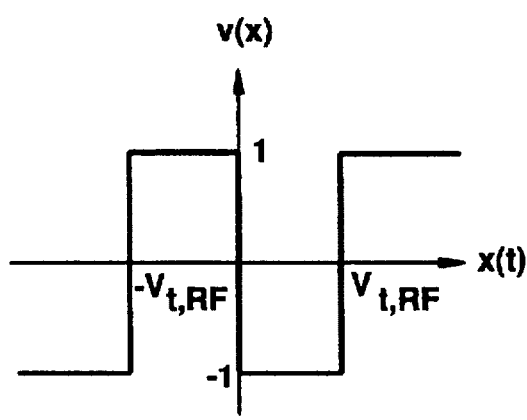
FIG. 3C is an illustration of the RF nonlinearity for the biased inverting limiter design.

The biased inverting limiter differs from the biased hard limiter only in that it contains an inverted hard limiter in the location of the null zone, between input voltages of $-V_{t,RF}$ and $V_{t,RF}$ (the "RF threshold"), as seen in FIG. 3C.

The biased inverting limiter voltage nonlinearity is expressed by:

$$v(x)=-1 \text{ for } x<-V_{t,RF} \quad (4a)$$

$$v(x)=1 \text{ for } 0>x>-V_{t,RF} \quad (4b)$$

$$v(x)=-1 \text{ for } 0<x<V_{t,RF} \quad (4c)$$

$$v(x)=1 \text{ for } x>V_{t,RF} \quad (4d)$$

The biased inverting limiter can readily be implemented in real-time hardware, since its output consists of only two discrete voltages which can be obtained from high-speed digital logic outputs. Also, the biased inverting limiter has odd symmetry, meaning that v(x)=−v(−x) and that DC and even harmonic outputs are zero under ideal conditions.

Figure 4A:
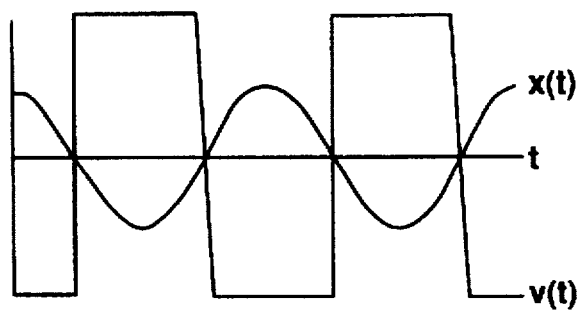
FIGS. 4A–4C illustrate the ideal time-domain response of the biased inverting limiter to a sinusoidal input as a threshold $V_{t,RF}$ is varied.
Figure 4B:
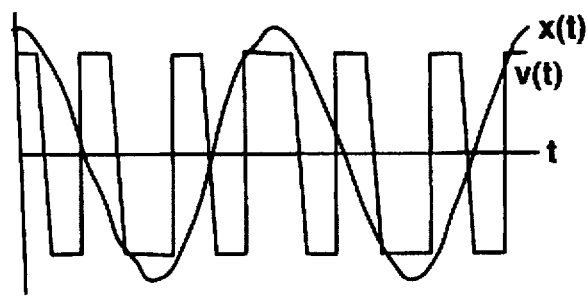
Figure 4C:
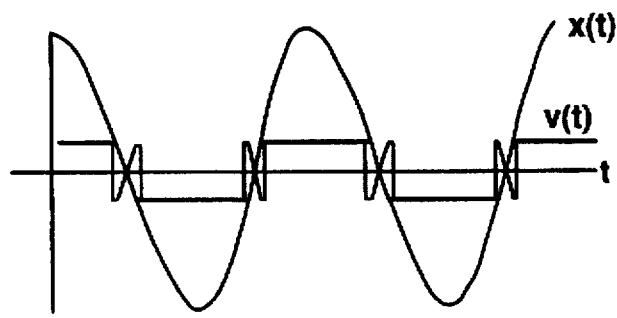

On the assumption that input additive Gaussian noise is negligible, the unfiltered output of the biased inverting limiter, v(t), when a single CW signal, x(t)=A cos (2πf₀t+φ) is input, is given in FIG. 4A when the input amplitude is less than $V_{t,RF}$. As shown in FIG. 4A, the biased inverting limiter reduces to an inverted hard limiter—the output is −1 when the input is positive and +1 when the input is negative. When the input signal amplitude is larger than $V_{t,RF}$, as seen in FIGS. 4B and 4C, the biased inverting limiter goes through six transitions in the output during each period of the input signal. Hence, during one period of the input, the output is positive in three distinct time intervals and negative in three distinct time intervals. Because there are three on/off output cycles (not necessarily equal in length) for every input cycle, the third harmonic component of the output is significant.

The ratio of A to $V_{t,RF}$ dictates the length of each output cycle. When A is much larger than $V_{t,RF}$, the voltage of the input signal is above $V_{t,RF}$ or below $-V_{t,RF}$ for an amount of time much greater than the amount of time that it is between $-V_{t,RF}$ and $V_{t,RF}$. Hence, the device reverts to a hard limiter (output a positive constant when input is positive, output a negative constant when input is negative) when the RF threshold approaches zero.

Quantitative analysis of bandpass nonlinear devices reduces to finding the first-harmonic envelope functions G(A) and F(A) and their analogs in the higher harmonics. These functions are determined by expanding the response of the voltage nonlinearity to a CW signal of peak amplitude A and frequency $f_o$ as a Fourier series. The coefficients of the Fourier series represent the envelope nonlinearities corresponding to the given frequencies. This technique may be applied to a general voltage nonlinearity v(x). The result is the well-known Chebyshev transform:

$$v_m(A) = (2/\pi) \int_0^\pi v(A \cos \theta) \cos m\theta \, d\theta \quad (5)$$

where $v_m(A)$ corresponds to the envelope transfer characteristic at the mth harmonic component of the output.

Here, the amplitude transfer functions $G_m(A)$ are equal to the absolute values of $v_m(A)$. If $v_m(A)$ (for a fixed value of m) is positive, then the mth-harmonic phase shift function $F_m(A)$ is zero; if $v_m(A)$ is negative, then $F_m(A)$ is 180°. Typically, the subscripts in $G_1(A)$ and $F_1(A)$ are dropped. Sometimes, G(A) is called the "AM/AM transfer function" and F(A) is called the "AM/PM transfer function."

Solving equation (5), we find that the first-harmonic envelope nonlinearity for the biased inverting limiter is:

$G(A)=4/\pi$ for $0<A<V_{t,RF}$ \hfill (6a)

$G(A)=|(8/A\pi)(A^2-V_{t,RF}^2)^{1/2}-4/\pi|$ for $A \geq V_{t,RF}$ \hfill (6b)

$F(A)=180°$ for $0<A<(2/\sqrt{3}) V_{t,RF}$, $0°$ otherwise \hfill (6c)

Figure 5A:
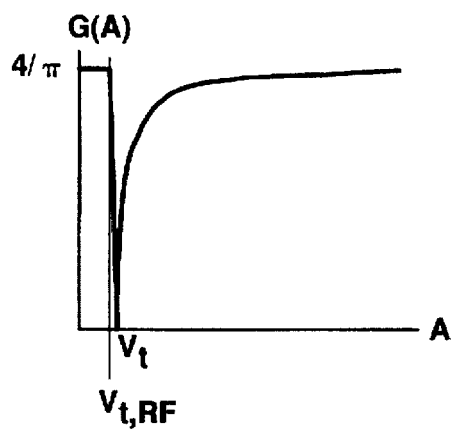
FIGS. 5A–5C illustrate the first-harmonic envelope non-linearity for the biased inverting limiter.
Figure 5B:
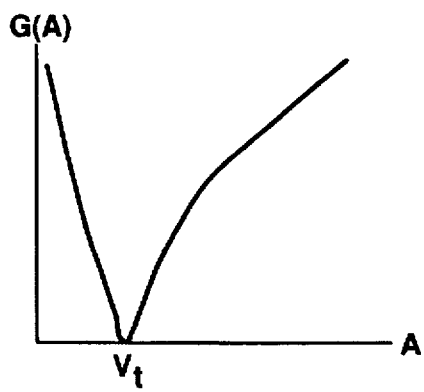
Figure 5C:
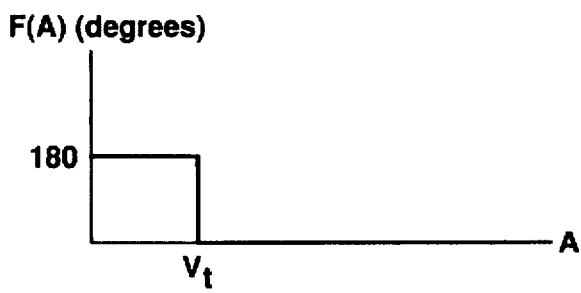

Sketches of G(A) and F(A) for the biased inverting limiter are given in FIGS. 5A–5C.

The quantity $V_t$ is called the "envelope threshold". This point on the G(A) curve is also referred to as an "amplitude trap", since the nonlinearity traps and eliminates signals with envelopes at that point.

For the biased inverting limiter, $V_t$ is calculated by letting G(A)=0 in Equation (6b), then solving for A. This process yields $V_t=(2/\sqrt{3})V_{t,RF}$; therefore, an adaptively obtained value of $V_t$ must be attenuated by approximately 1.25 dB in order to obtain a suitable RF threshold.

The behavior of G(A) and F(A) in the vicinity of $V_t$ provides the RFI suppression properties of the biased inverting limiter. The wanted signal causes the composite input envelope to fluctuate above and below the interference envelope; these fluctuations are retained by the nonlinearity, since the amplitude trap acts only on the larger, interfering waveform. Due to the 180° phase difference between the two sides of the trap, the envelope fluctuations due to the wanted signal on both sides of the interferer are preserved-thus overcoming one of the limitations of the biased hard limiter (and all other null zone devices), which removes portions of the wanted signal.

Figure 6:
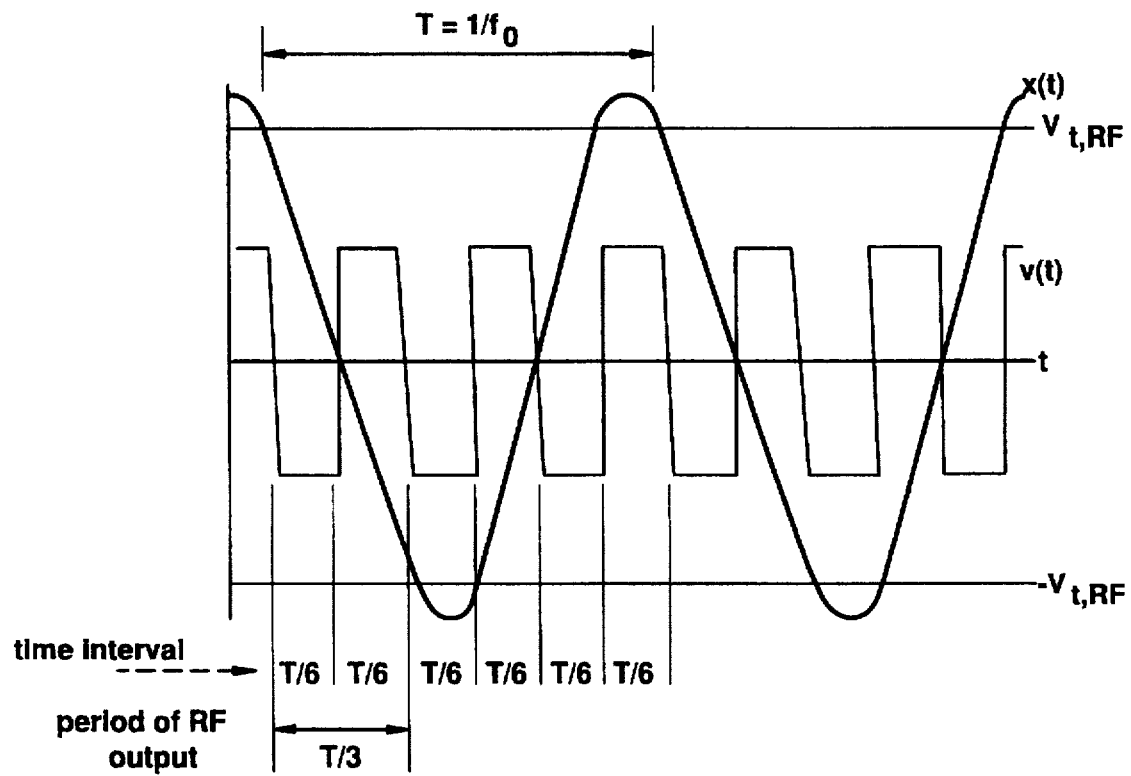
FIG. 6 illustrates the unfiltered time-domain response of the biased inverting limiter to a sinusoidal amplitude input at the amplitude trap.

The physical manifestation of the amplitude trap at $A=V_t$ can be understood by examining the unfiltered time-domain response v(t) of the RF nonlinearity to the CW input $x(t)=V_t \cos (2\pi f_o t+\theta)$. This is illustrated in FIG. 6.

Note that v(t) is a bipolar (i.e. no DC component) square wave that repeats every T/3 seconds, where $T=1/f_o$ is the period of the input signal. The fundamental frequency of v(t) is 1/(T/3) or $3 f_o$. Because the output is bipolar, there will be no even harmonic components; the harmonics occur at $3 f_o$, $9f_o$, $15f_o$, $21f_o$, and so forth. Hence, $G_m(A)$ evaluated at $A=V_t$ is nonzero for m=6k–3 (with k representing all positive integers) and zero for all other values of m, including for m=1 (the fundamental frequency of the input).

This qualitative approach is validated by evaluation of the biased inverting limiter third-harmonic envelope nonlinearity, which has been by solving equation 5.

The solution is expressed as:

$G_3(A)=4/3\pi$ for $0<A<V_{t,RF}$ \hfill (7a)

$G_3(A)=|(8/A\pi)(A^2-V_{t,RF}^2)^{1/2}-(32/3A^3\pi)(A^2-V_{t,RF}^2)^{3/2}+4/3\pi|$ for $A \geq V_{t,RF}$ \hfill (7b)

$F_3(A)=0°$ for $0<A<(1-\cos^2(\pi/9))^{-1/2} V_{t,RF}(\approx .92 V_{t,RF})$, $180°$ otherwise \hfill (7c)

Sketches of the first- and third-harmonic envelope nonlinearities are shown in FIGS. 7A–7D.

Figures 7A, 7B:
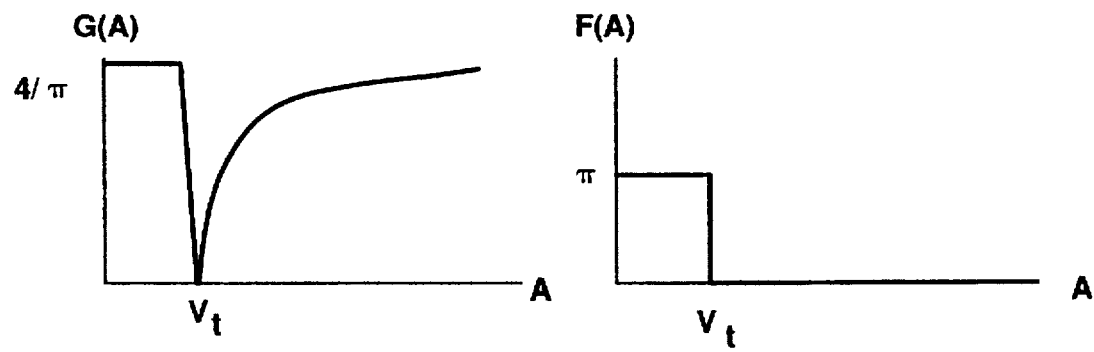
FIGS. 7A and 7B illustrate the fundamental frequency interference power as a function of input amplitude for the biased inverting limiter.
Figures 7C, 7D:
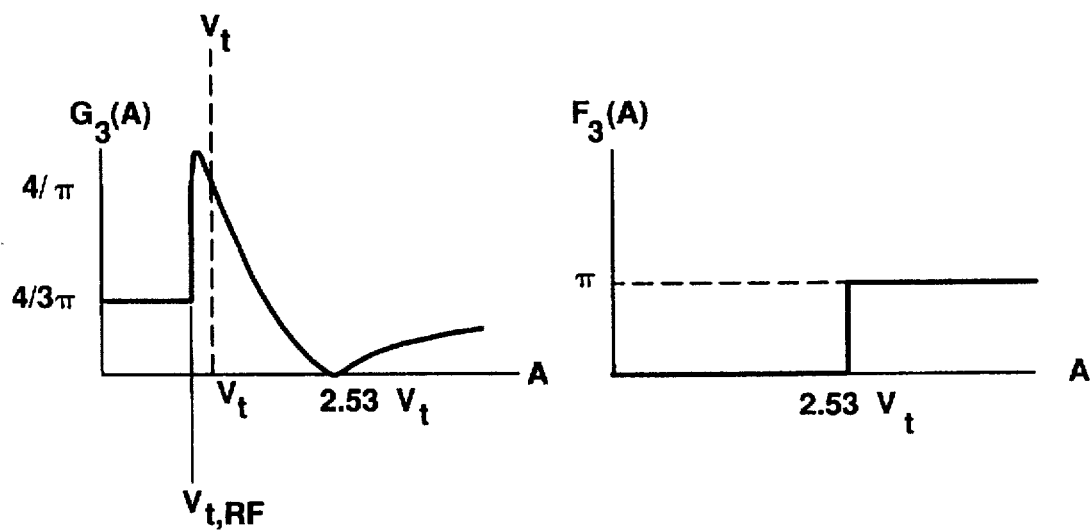
FIGS. 7C and 7D illustrate the third harmonic power output from the biased inverting limiter as a function of interference signal amplitude.

The peak of the $G_3(A)$ curve in FIG. 7C is located at the same value of A as the first-harmonic amplitude trap. The maximum value of $G_3(A)$ is equal to the maximum value of G(A). Therefore, the effect of the biased inverting limiter when the RF threshold is properly set is to transfer the interference energy out of the first zone so that a first zone filter can attenuate it.

Figure 3D:
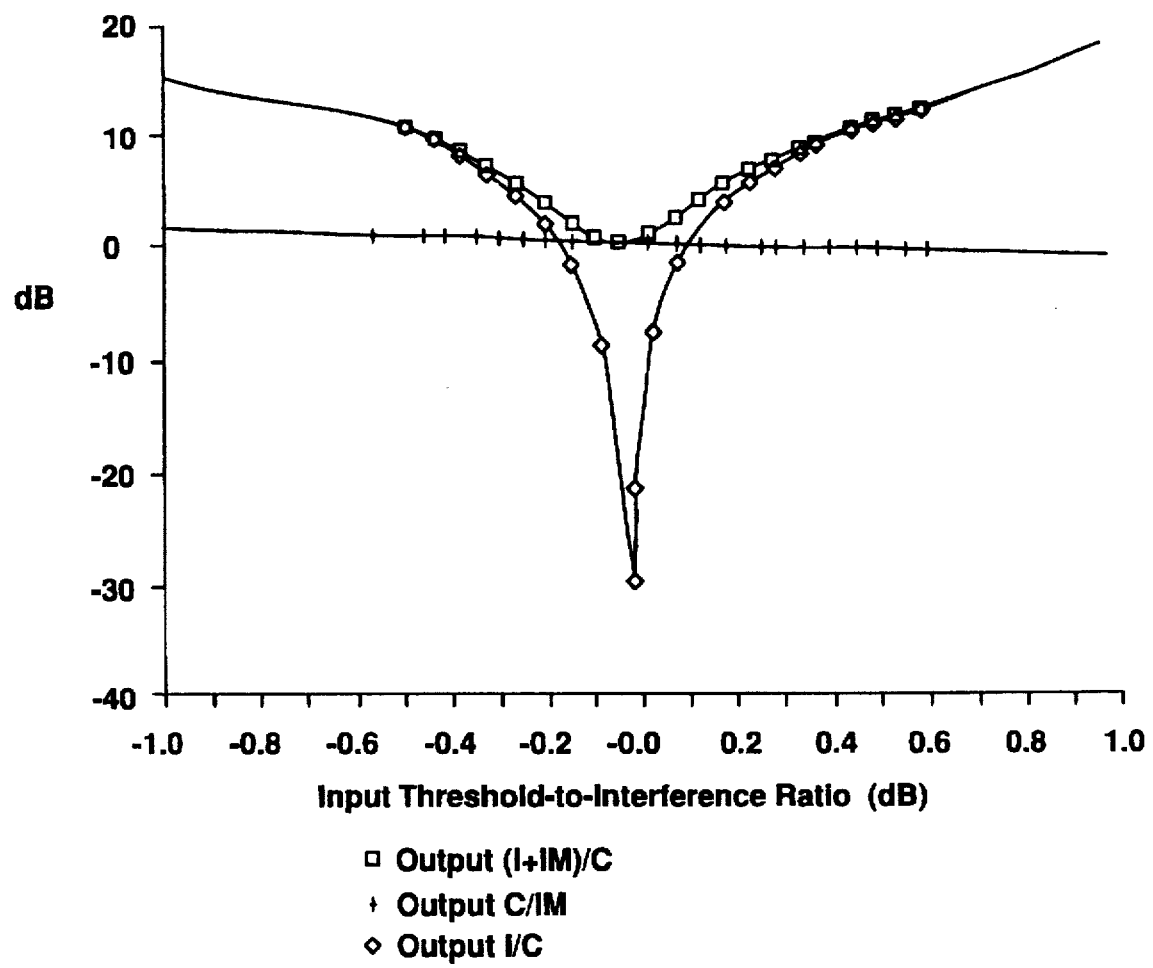
FIG. 3D is an illustration of the theoretical biased inverting limiter sensitivity to threshold error for the case where the input unwanted-to-wanted signal ratio was 30 dB (i.e., a factor of 1000).

The biased inverting limiter performance is shown in FIG. 3D. The best possible interference (I)-plus- intermodulation (IM)-to-carrier (C) ratio (I+IM)/C performance of the biased hard limiter is approximately 5 dB; the best (I+IM)/C provided by the biased inverting limiter is 0 dB. 0 dB is the best attainable effective (I+IM)/C with an optimum amplitude nonlinearity when the input interference is stronger than the input wanted signal and the noise is negligible; therefore, the ideal biased inverting limiter performs at the theoretical limit for an amplitude-based nonlinear device. Note, however, that 0 dB is still not the optimum level attainable by any means, since an ideal subtraction circuit (one which subtracts the CW signal) will reduce interference to zero.

When the envelope threshold is equal to the input amplitude of the interference ($V_t/I_{in}=0$ dB), the biased hard limiter leaves interference approximately 3 dB stronger than the remaining wanted signal and intermodulation 0.5 dB stronger than the remaining wanted signal. On the other hand, the biased inverting limiter all but eliminates the interference (output I/C=−29 dB when $V_t/I_{in}=0$ dB), leaving intermodulation equal in power to the wanted signal.

If the biased hard limiter is used, a tracking error that results in placement of the envelope threshold at a higher value than the peak of the composite input envelope ($V_t/I_{in} \geq 0.27$ dB for an input I/C of 30 dB) will destroy both interfering and wanted signals. The biased inverting limiter does not share the problem; even when the error in estimating the envelope threshold is as much as 0.5 dB in either direction, the biased inverting limiter improves (I+IM)/C by 18 dB (as opposed to 13 dB of improvement when the null zone threshold is set 0.5 dB too low).

The ability of the biased inverting limiter to suppress strong interference has motivated its use in a way which improves upon the previous Smart AGC™ approach.

Figure 8:
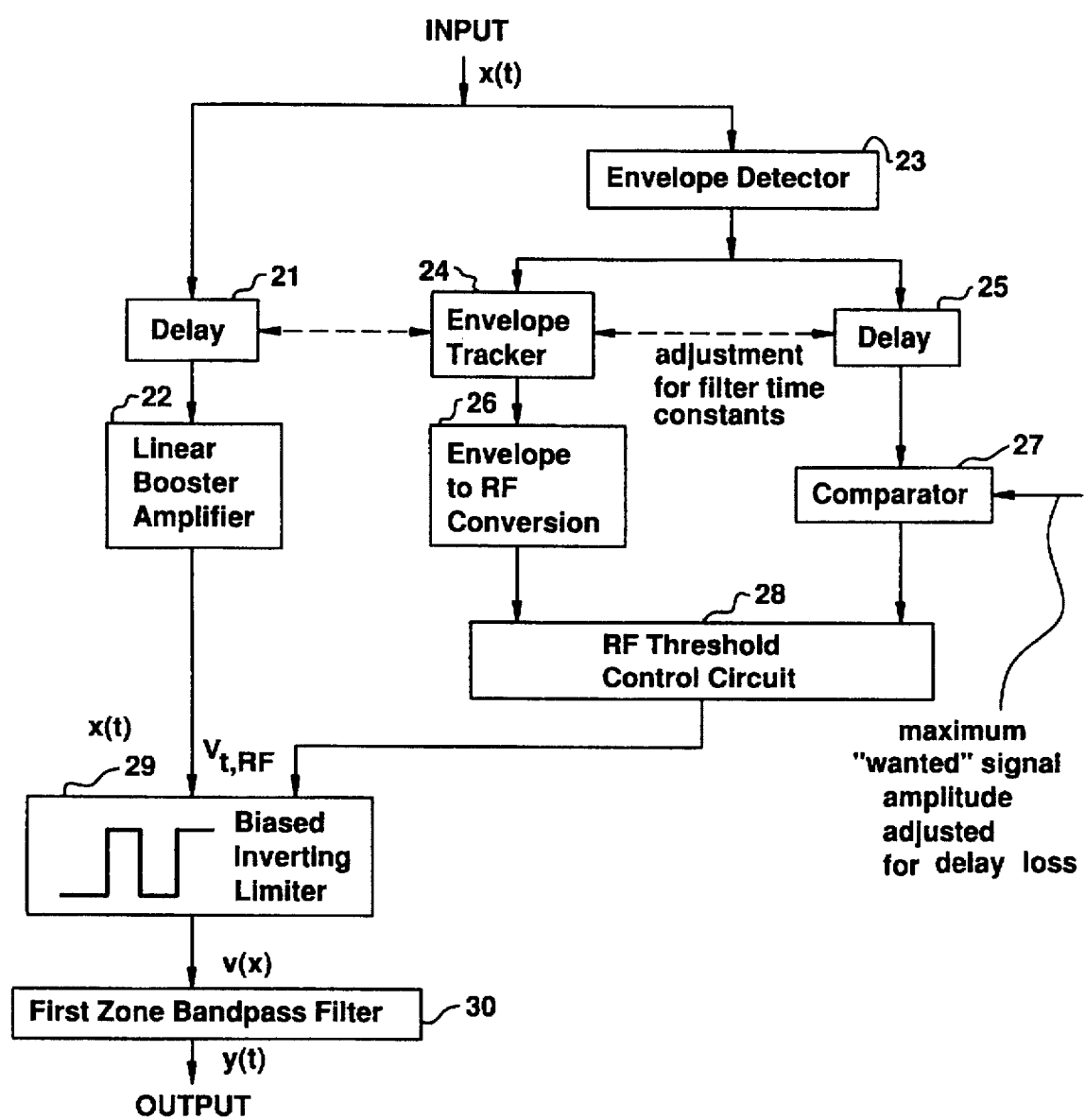
FIG. 8 is a block diagram arrangement illustrating a variation of FIG. 2 showing the application of the biased inverting limiter to an interference reduction device.

In FIG. 8, an input is provided to two parallel paths leading to a single output. The first path comprises a delay 21 and a linear booster amplifier 22. The second path comprises an envelope detector 23, whose output is provided in parallel to a tracker 24 and a delay 25. The tracker 24 outputs to an envelope to RF conversion circuit 26 which itself outputs to an RF threshold control circuit 28. The delay 25 outputs to a comparator 27, which compares the envelope to a voltage called "max wanted signal". The purpose of the comparator is to bypass the use of a voltage window ($V_{t,RF}$) whenever the absolute input envelope is so small that the presence of RFI becomes ambiguous. Thus, the RF threshold control circuit 28 output will be either the filtered envelope or zero. A zero output means the estimated RF is too small to provide a correction. The circuit 28 will input in common to a biased inverting limiter 29 together with the output of the linear booster amplifier 22. A first zone filter 29 is provided before the output of the stage to limit the band of operation to the vicinity of the input band.

The mechanism that sets $V_{t,RF}$ from estimation of the interference amplitude 23, 24, 26, 27, 28 requires time to operate and as such must be equalized with delays in parallel paths 21, 25. Present-day high-frequency delay devices are lossy; hence, a linear booster amplifier 22 is required in the RF path. To ensure that the net insertion losses encountered by the tracking path and the RF path are as equal as possible, power compensation, in the form of either an amplifier or an attenuator, must be included in the envelope tracker 24.

After the tracker has been power-compensated, the voltage along the tracking path is $V_t$; an additional 1.25 dB of attenuation is required to convert this to the RF threshold, since $V_{t,RF}=(\sqrt{3}/2)V_t$. This factor of 1.25 dB can easily be accounted for in the power compensation at the output of the tracking filter; it has only been separately noted as "envelope to RF conversion" 26 for the purpose of illustration. The detected amplitude of the input signal-plus-interference-and-noise (the output of envelope detector 23) is compared with a fixed maximum amplitude-determined from a priori knowledge of the wanted signal—to ascertain whether the interference is sufficiently high for the biased inverting limiter to have a beneficial effect. If the comparator 27 indicates that the interference does not exist or is not powerful enough to significantly affect the composite envelope, the RF threshold control circuit 28 sets $V_{t,RF}$ to zero; otherwise, the control circuit 8 passes the value of $V_{t,RF}$ estimated by the tracking path to the biased inverting limiter circuit 29. The biased inverting limiter circuit processes the RF signal and threshold estimation, then passes the output to the first zone bandpass filter 30.

A functional block diagram of the biased inverting limiter circuit is given in FIG. 9. There the RF input is provided to the emitter-coupled logic (ECL) window comparator 31 and the ECL hard limiter 32 in parallel. The outputs from the two ECL devices are applied to an exclusive NOR 33 and then to an ECL-to-bipolar conversion unit 34 before being output as an RF signal. There are three ECL voltage comparators used in the circuit. Ideally, the comparators turn on (output a "logic 1" which is typically −0.9 volt in ECL) when the voltage at the noninverting (positive) input terminal is greater than the voltage at the inverting (negative) input terminal, and turn off ("logic 0" or typically −1.7 volts) when the reverse is true. In this mode, the comparators function as one-bit analog-to-digital converters.

Figure 10A:
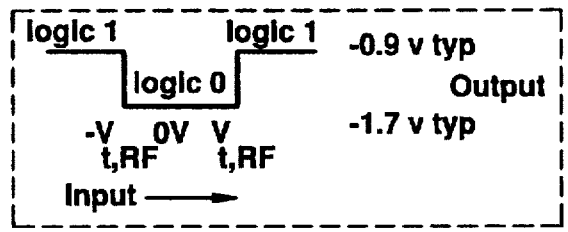
FIGS. 10A–10D are waveforms applicable to the circuit of FIG. 9.

A combination of wanted and interfering RF signals that are terminated with purely resistive 50-ohm loads to ground (the "RF input") is applied to the noninverting terminals of three voltage comparators (two of these comprise the "ECL window comparator" unit 31 having an output I/O characteristic shown in FIG. 10A; the third is the "ECL hard limiter" unit 32). The inverting terminals are biased as follows.

Figure 10B:
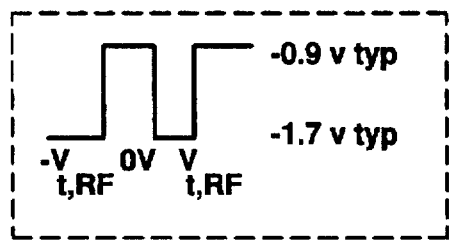
Figure 10C:
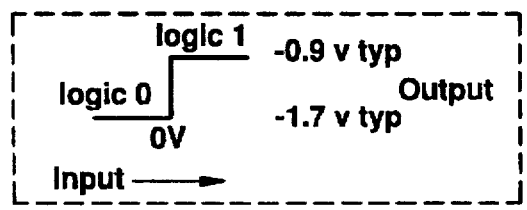

The inverting terminal of the ECL hard limiter 32 is grounded; hence, it has the voltage transfer characteristic (VTC) as shown in FIG. 10C, behaving as a hard limiter that has been attenuated by approximately 8 dB and has a negative DC offset of approximately 1.3 volts.

One of the comparators in the "ECL window" is biased with a DC voltage, $V_{t,RF}$, that is proportional to the interference amplitude. The other comparator in the ECL window is biased with $-V_{t,RF}$. The logical complement of the negatively biased comparator output is tied to the output of the positively biased comparator. A third wire that extends from the connection of the two comparator outputs carries the logical "OR" of these outputs (known as a "wired OR" because of the absence of a gate) which is shown above the "ECL window comparator" unit 31 as a function of instantaneous RF input voltage.

The outputs of the window comparator 31 and ECL hard limiter 32 are then passed through an "exclusive NOR" (XNOR) gate 33, which returns a logic 1 when both inputs are the same and a logic 0 when the inputs differ from each other. The resulting VTC is shown in FIG. 10B.

Figure 10D:
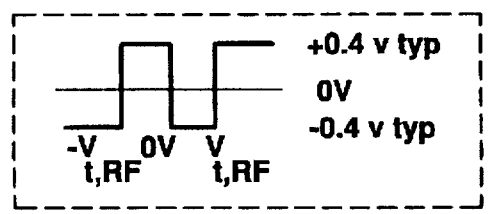

The XNOR output waveform is converted to a bipolar signal by a capacitor that blocks its DC component 34. The design result, shown in FIG. 10D, matches the ideal VTC except that the design result has approximately 8 dB (20 $\log_{10}\{1/0.4\}$) less gain. This reduction in gain was expected to influence the wanted signal and interfere equally and, thus, have no effect on interference suppression performance.

When the biased inverting limiter is integrated into an RFI suppression system, the RF threshold is set by dynamic tracking of the interference envelope. For this circuit, a tracker may be used or the mechanism that sets $V_{t,RF}$ for the biased inverting limiter prototype may be manually controlled. In the latter case, it is a resistive voltage divider that consists of a "pull-down" resistor connected to the positive DC voltage that powers the integrated circuits (+5.0 v) and, through a potentiometer ("pot"), to ground. $V_{t,RF}$, the voltage across the pot, can be varied between zero and 1.7 volts. The additive inverse of $V_{t,RF}$ is obtained from an operational amplifier connected in an inverting loop with two equal feedback resistances.

We claim:

1. A signal processor for Radio Frequency Interference (RFI) suppression comprising:

an input for a signal comprising a wanted signal plus interference;

time delay means for receiving said input signal;

voltage variable biased inverting limiter means for receiving the output of said time delayed signal;

means for providing an adjustment of said limiter means based on the envelope of said input signal; and filter means for receiving the output of said limiter means and providing an output with reduced interference.

2. The signal processor for RFI suppression as set forth in claim 1 wherein said limiter means is operative within a variable range of input voltages to provide an inverted output voltage and wherein said adjustment means is operative to vary said range of input voltages.

3. The signal processor for RFI suppression as set forth in claim 2 wherein said output voltage is a first polarity for input values less than a first negative range value and is a second polarity for input values greater than a second positive range value, and for input values between said first and second range values, said input voltage is subject to inversion.

4. An amplifier for a communications receiver having a circuit comprising:
   an input circuit which receives an incoming signal; a broadband envelope measuring circuit which determines the signal strength of said incoming signal;
   a prediction circuit which predicts the level of an unwanted component of said incoming signal; and
   an inverted hard limiter circuit for producing a drive signal for the amplifier based on said incoming signal and for dynamically controlling the size of an inversion zone in said drive signal in accordance with the level of said unwanted component of said incoming signal.

5. The communications receiver as recited in claim 4 wherein when the envelope level of the incoming signals is less than a predetermined value, no inversion is provided.

6. The communications receiver as recited in claim 4 wherein when the envelope level of said incoming signals increases, the number of transitions increases, and when the envelope level of the incoming signals decreases, the number of transitions decreases.

7. A method for controlling nonlinear processing of an RF signal, having a wanted signal and an unwanted interference signal, comprising:
   estimating the amplitude of said interference signal;
   dynamically varying the size of an inversion zone defined between RF threshold values based on the estimated strength of said interference signal; and
   providing an inversion nonlinearity for input signals within said inversion zone and generating an output signal.

8. The method as recited in claim 7, further comprising:
   receiving said composite input signal; and
   processing the envelope of said composite input signal to estimate the amplitude of said interference signal.

9. The method as recited in claim 7 wherein said input signal is quasi-periodic at one frequency and said transitions providing multiple output transitions during each period of said input signal within said inversion zone, thereby causing the interference to be converted from its original frequency to a multiple of the original frequency.

10. The method as recited in claim 9 wherein the length of each output transition is a function of the ratio of the combined input signal amplitude to the magnitude of said RF threshold values.

11. The method as recited in claim 9 wherein said output transitions comprise shifts of 180° phase when measured at RF Frequencies near the original input signal band.

12. The method as recited in claim 11 wherein said phase differences define the location of a trap which will effectively eliminate interfering signals while preserving previously superimposed envelope fluctuations due to wanted signals.

13. The method as recited in claim 7 further comprising zone filtering said output signal to eliminate the third and higher harmonics of the original signal band.

14. An Radio Frequency Interference (RFI) control apparatus for controlling the nonlinear processing of an RF signal, having a wanted signal and an unwanted interference signal, comprising:
   means for generating a control signal for dynamically varying the size of an inversion zone defined by RF thresholds having an amplitude based on the estimated strength of said interference signal; and
   limiter means responsive to said input RF signal and said control signal for providing an inversion nonlinearity for input signals within said inversion zone and for providing an output signal.

15. The apparatus as recited in claim 14 wherein said generating means comprises:
   means for processing the envelope of said composite input signal to estimate the amplitude of said interference signal;
   comparator means for determining whether said interference signal exceeds a threshold value; and
   control means responsive to said comparator means for adjusting the magnitude of said threshold values.

16. The apparatus as recited in claim 15 wherein said limiter means provides multiple output transitions during each period of said input signal, the length of each output transition being a function of the ratio of the combined input signal amplitude to said RF threshold amplitude.

17. The apparatus as recited in claim 16, further comprising:
   means for delaying and amplifying said composite input signal and providing said signal as an input to said limiter means.

18. The apparatus as recited in claim 17 wherein said composite RF output signal is output to a band pass filter.

19. The apparatus as recited in claim 14 wherein said limiter means comprises:
   means for removing interference from RF signals by the creation of a voltage controllable, time-variant, envelope transformation according to:

$$G(A)=4/\pi \text{ for } 0<A<V_{t,RF} \qquad (6a)$$

$$G(A)=[(8/(A\pi)(A^2-V_{t,RF}^2)^{1/2}-4/\pi] \text{ for } A \geq V_{t,RF} \qquad (6b)$$

$$F(A)=180° \text{ for } 0<A<(2/\sqrt{3})\, V_{t,RF},\ 0° \text{ otherwise} \qquad (6c)$$

wherein
   A is the amplitude of the composite signal
   G(A) comprises an AM/AM transfer function
   F(A) comprises an AM/PM transfer function
   $V_{t,RF}$ is an input voltage threshold.

20. A means for removing interference from RF signals by the creation of a voltage-controllable, time-variant envelope transformation as in claim 19, where the voltage control is obtained by one of a prediction of the interfering signal's envelope and a linear scaling of said envelope.

* * * * *